United States Patent [19]

Takaiwa

[11] Patent Number: 4,894,723

[45] Date of Patent: Jan. 16, 1990

[54] IMAGE SENSING APPARATUS

[75] Inventor: Kan Takaiwa, Tokyo, Japan

[73] Assignee: Canon Kabushiki Kaisha, Tokyo, Japan

[21] Appl. No.: 185,551

[22] Filed: Apr. 25, 1988

[30] Foreign Application Priority Data

Apr. 30, 1987 [JP] Japan .................................. 62-104537
Apr. 30, 1987 [JP] Japan .................................. 62-104538

[51] Int. Cl.$^4$ ............................................. H04N 5/238
[52] U.S. Cl. ...................................... 358/228; 358/909
[58] Field of Search .............. 358/213.19, 228, 213.13, 358/213.29, 213.24, 213.25, 909, 224

[56] References Cited

U.S. PATENT DOCUMENTS

| | | | |
|---|---|---|---|
| 4,369,469 | 1/1983 | Endo et al. | 358/213.25 |
| 4,410,915 | 10/1983 | Yamamoto | 358/228 |
| 4,532,550 | 7/1985 | Bendell et al. | 358/213.13 |
| 4,599,657 | 7/1986 | Kinoshita et al. | 358/213.24 |
| 4,638,350 | 1/1987 | Kato et al. | 358/228 |
| 4,689,689 | 8/1987 | Saito et al. | 358/228 |
| 4,734,777 | 6/1987 | Okino et al. | 358/213.19 |
| 4,763,196 | 6/1987 | Sakai | 358/213.19 |

*Primary Examiner*—Jin F. Ng
*Assistant Examiner*—Stephen Brinich

[57] ABSTRACT

An image sensing apparatus comprising a diaphragm for controlling the amount of incident light, an image pickup element for photo-electrically converting the light incident through the diaphragm, a circuit for supplying an output of the image pickup element to an electronic view finder, a recording circuit for recording the output of the image pickup element, a light measuring circuit for measuring an ambient brightness, and control means for controlling a drive speed of the image pickup element and/or the diaphragm in accordance with the brightness measured by the light measuring circuit, wherein controlling is made such that the depth of field of the object image recorded when shooting is prevented from becoming shallower than the displayed object image in the electronic view finder before the start of shooting.

34 Claims, 5 Drawing Sheets

IMAGE SENSING APPARATUS

BACKGROUND OF THE INVENTION

1. Field of the Invention

This invention relates to an image sensing apparatus having display means in the form of an electronic viewfinder on which the picture taken by image pickup means is displayed.

2. Description of the Related Art

In general, the finders for the still video cameras have been of the optical form. An electronic view finder is realized as known in the art. Of the optical finders there are the reflex finder of TTL (Through-The-Lens) type and the external finder.

The reflex finder has either a returnable total reflection mirror or a fixed half-reflection mirror. By means of this mirror, the light passed through the photographic lens is brought to the focusing screen in which an image is formed. As it is this image that is observed, the finder has the advantage of being free from the parallax that varies with variation of the object distance. However, to allow for the operator, while looking the finder image, to carry out focusing, the focusing screen and the image pickup element have to be put in the optically equivalent positions to each other. To this end, the necessity of adjusting the position of the focusing screen with high accuracy becomes prerequisite.

Other drawbacks are that in the case of using the return mirror in the space between the focusing screen and the image pickup element, the operating mechanism is of complicated structure, and that at the moment the exposure is being made, the object image is taken out of sight. In the case of using the half-mirror, the accepted light is shared by the image pickup element and the finder with the result that the finder is given a darkened viewfield, while the image pickup element is lowered in effective sensitivity. In any of the above-described cases, because of having the mirror, the optical system must be provided with a long back focal distance. From the point of achieving view of the minimum size of the apparatus, the flexibility of lens design in adaptation to short focal lengths is largely restricted.

The external finder has its optical system provided in separation from the photographic one. Though it does not suffer the drawback arising from the use of the mirror as in the reflex finder, the finder image has a parallax with the actually taken image. The magnitude of this parallax varies as the object distance varies. Also, the finder image does not suffice in itself for focusing. So, there is need to make additional use of distance measuring means.

Unlike this, the electronic view finder cooperates with the image pickup element in such a manner that an image formed on the latter is photo-electrically transduced to a signal from which the image is then reproduced, for example, in a liquid crystal display element or the like. Since this reproduced image is observed, no parallax is produced. Also since the optical system does not require the above-described mirror in the middle point of the optical path thereof, the electronic view finder is most suited to the minimization of the size of the apparatus. Further, it has an advantage that even during the making of an exposure, the object image can be observed without interruption.

Nonetheless, particularly when applying the electronic view finder to the automatic exposure (AE) type camera, for example, a video camera, in which the size of aperture and the shutter speed are determined depending on the brightness, it has been common practice that other than the exposure time, while the shutter speed is fixed, the size of aperture is automatically adjusted in accordance with the object brightness by an automatic exposure mechanism.

Hence, as the object brightness increases, the diaphragm is stopped down, causing the depth of field of the optics to deepen. As a result, the image of the object's background displayed in the electronic view finder also becomes sharper. Even if its sharpness is slightly deviated from the acceptable level, therefore, this defocus becomes difficult to recognize from the displayed image. And, upon seeing that the sharp focus has been reached, the operator pushes down the shutter button. After that, the automatic exposure mechanism determines what values the aperture size and shutter speed should take to make an exposure. The conventional still video camera of this kind has, however, the following problem.

That is, since it is in the display time preceding the exposure time that without using the shutter, the size of diaphragm aperture is adjusted in accordance with the brightness level so that the light amount on the image pickup element becomes proper, it will occur in the actual exposure time that as the diaphragm is opened up to the aperture value determined by the object brightness and the preset shutter speed, the depth of field becomes shallower by an increase of the aperture size from before the exposure so that the picked-up image is apt to further decrease in sharpness. Therefore, for the bright object, a phenomenon that in the picked-up image, the background is out of focus will appear with high possibility. Conversely when the scene is dim, another phenomenon that the background is taken with a sharper focus than was seen in the finder will appear with high possibility. In any case, the image on the display in the electronic view finder (EVF) before the exposure and the actually picked-up image differ in sharpness from each other. These phenomena are prominent particularly when the control of the shutter speed priority is performed by the AE mechanism.

Also, further, because the exposures for the EVF display and shot are set in separation, the aperture size changes from the set value of exposure at the EVF display time to the set value of exposure at the shoot time. Therefore, if the shutter is of the mechanical type, a problem exists in that a time lag in particular takes place from the actuation of the shutter release to the start of the exposure.

SUMMARY OF THE INVENTION

It is, therefore, a first object of the invention to eliminate such problems and to provide an image sensing apparatus capable of obtaining a sharper image pickup result than the image displayed in the electronic view finder before the exposure regardless of the difference of the photographic conditions.

To achieve such an object, according to a preferred embodiment of the invention, the apparatus is provided with a diaphragm for restricting the amount of incident light, image pickup means for photo-electrically converting the light incident through the diaphragm, means for supplying an output of the image pickup means to display means, recording means for recording the output of the image pickup means, light measuring means for measuring an ambient brightness, and control means for setting the diaphragm aperture to a predetermined size when the output of the image pickup means is displayed by the display means at times other than when the output of the image pickup means is recorded by the recording means, and for controlling the image pickup time of the image pickup means in accordance with the brightness measured by the light measuring means.

By this, in other than the exposure time, when the object image picked up by the image pickup element as the image pickup means is displayed in, for example, the electronic view finder as the display means through the supply means, the drive speed of the image pickup element is set to an adjusted value by the control means in accordance with the brightness of the object measured by the light measuring means. Therefore, the diaphragm can be fixed at the full open aperture. When the exposure is made, the depth of field of the optical system is increased, regardless of whatever values the aperture size and the shutter speed are changed to and set in. Hence, the background of the picture in the image picked-up result recorded in the recording means becomes sharper without blurring than before the exposure.

A second object of the invention is to solve the above-described problems and to provide an image sensing apparatus which has, despite any difference in photographic conditions, a sharper image picked-up result than the image displayed in the electronic view finder before the exposure to be obtained and which minimizes the time lag ascribable to the control of the diaphragm between before the exposure and the exposure time to make it possible to take a quick shot.

To achieve such an object, according to a preferred embodiment of the invention, the apparatus is provided with image pickup means for photo-electrically converting light incident through a diaphragm, supply means for supplying an output of the image pickup means to display means to cause display of a moving image, recording means for recording the output of the image pickup means as a still image, light measuring means for measuring an ambient brightness, and control means for controlling the aperture size of the diaphragm and/or the image pickup time of the image pickup means in any of the times when the output of the image pickup means is displayed by the display means and when the output of the image pickup means is recorded in the recording means.

By this, the invention is, when in any of the display and record modes, adapted to set the drive speeds of the diaphragm and the image pickup means by the control means, depending on the amount of incident light measured by the light measuring means. Hence, an object image which was displayed as the moving image on the display means by the supply means when in the display mode before the start of the exposure and another object image which has been recorded as the still image in the recording means at the exposure time when in the record mode become almost the same. Thus, it is made possible to prevent the image to be recorded from defocusing due to the shift of the depth of field of the lens. Also, the possibility of occurrence of re-resetting of the diaphragm in intervals before the exposure and the exposure time is reduced as far as possible, whereby the time lag resulting from the setting of the diaphragm can be removed.

Other objects and features of the invention will become apparent from the following description taken in conjunction with the drawings.

DETAILED DESCRIPTION OF THE PREFERRED EMBODIMENTS

The invention is next described in detail in connection with embodiments thereof by reference to the drawings.

Figure 1:
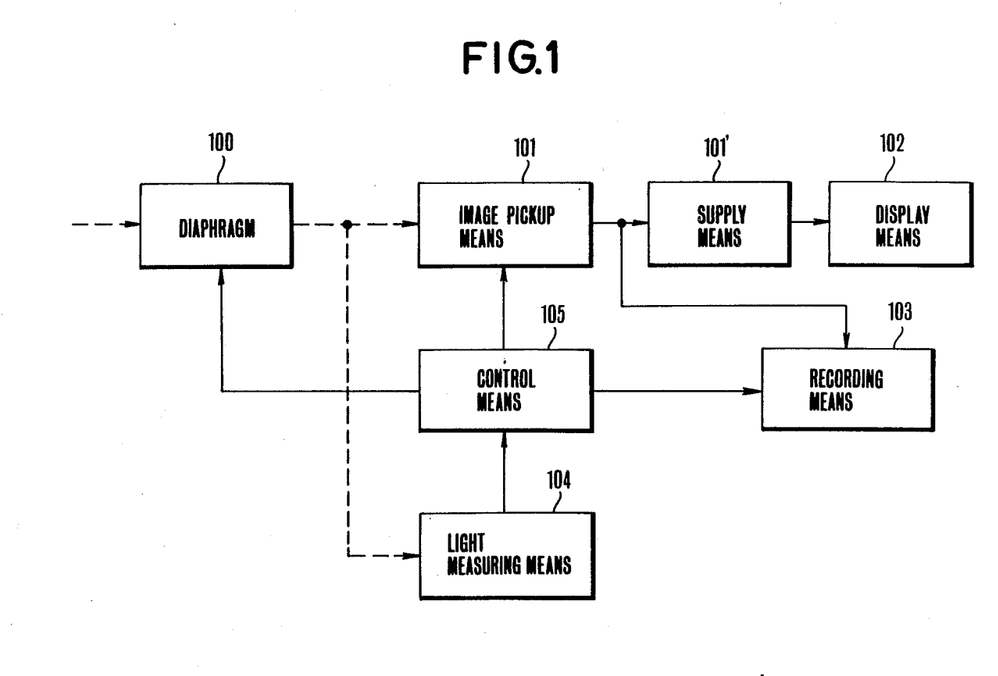
FIG. 1 is a block diagram illustrating an example of the structure of an embodiment of the invention.

FIG. 1 in block diagram illustrates the principal structure of an embodiment of the invention. In FIG. 1, 100 is a diaphragm for restricting the entering rays of light. Image pickup means 101 in the form of an image pickup element, for example, CCD (Charge Coupled Device) photo-electrically converts incident rays of light conveyed through the diaphragm 100. The output of the image pickup means 101 is supplied to display means 102 by supply means 101'.

The display means 102 displays the output of the supply means 101'. Recording means 103 records the output of the image pickup means 101 onto a recording medium, for example, a magnetic tape or sheet.

Light measuring means 104 measures the ambient brightness. In a case other than the case when the output result of the image pickup means 101 is recorded by the recording means 103, at a time when the output of the image pickup means 101 is displayed by the display means 102, control means 105 sets the diaphragm 100 to a predetermined aperture value and sets the image pickup time of the image pickup means 101 to an adjusted value in accordance with the light amount measured by the light measuring means 104. Though, in this embodiment, the control means 105 is described as arranged to control the drive speed of the image pickup means 101, the invention is not confined to this method. Many other methods such as those using the mechanical type shutter, electronic shutter, etc. may be applied provided that the accumulation time of the image pickup element 101 can be controlled.

Figure 2:
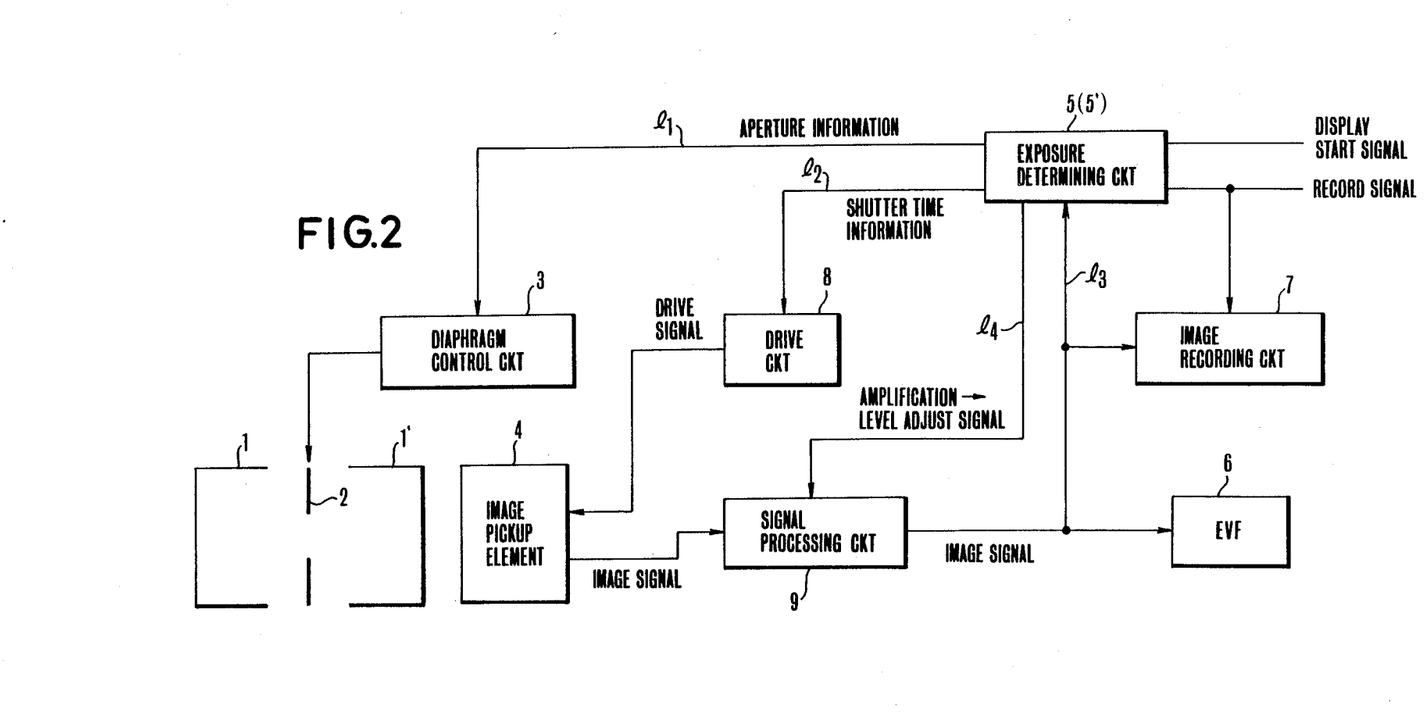
FIG. 2 is a block diagram illustrating an example of specific structure of the FIG. 1 embodiment of the invention.

FIG. 2 shows an example of the practical construction and arrangement of the FIG. 1 embodiment.

In FIG. 2, lenses 1 and 1' constitute a photographic optical system. 2 is a diaphragm mechanism for controlling the amount of incident light.

A diaphragm control circuit 3 varies the size of aperture in the diaphragm mechanism 2, and sets it to an aperture value depending on the aperture information sent from an exposure determining circuit 5. A solid state image pickup element (CCD) 4 photo-electrically converts the incident rays of light, constituting part of the image pickup means 101. Further, the CCD 4 also serves as the light measuring means 104, as the photo-electrically converted signal is used for that purpose.

Figure 3:
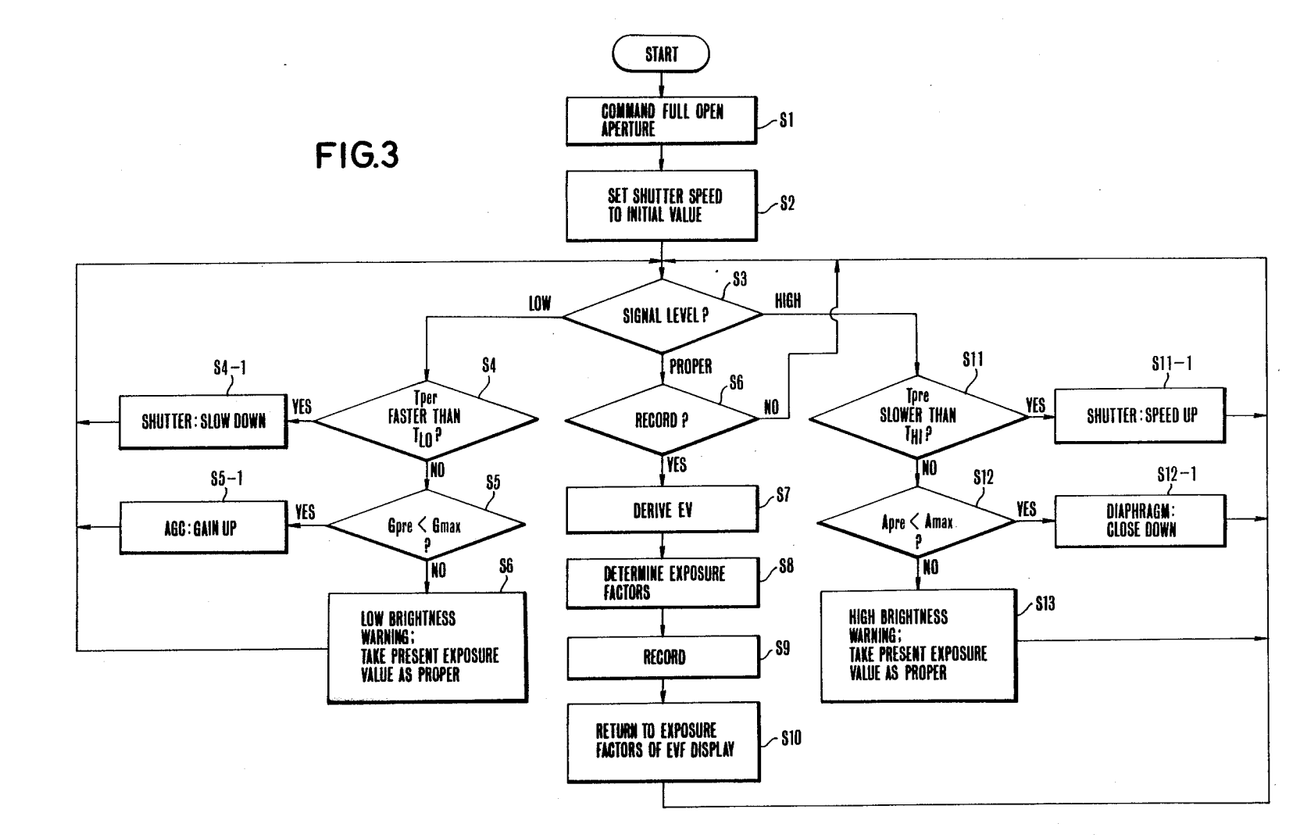
FIG. 3 is a flowchart illustrating an example of a program for the control of the exposure determining circuit 5 in the first embodiment of the invention.

The exposure determining circuit 5 constitutes the control means 105 for determining the aperture value and the value of shutter speed depending on the brightness of the object to be photographed, and is constructed with a computer unit (CPU), a random access memory (RAM) and a read only memory (ROM). A program for the control of its operation is shown in FIG. 3. Referring to this, how it determines the aperture size and/or the shutter speed will be described later.

An electronic view finder 6 (EVF) has a liquid crystal display element (LCD) as the display means 102 and a drive circuit as the supply means 101'. This liquid crystal element displays picture information with a frequency of 1/60 for the field of the standard television display.

A recording circuit 7 constitutes part of the recording means 103 for recording the picture information on a recording medium such as a floppy disk.

A drive circuit 8 drives the image pickup element 4, constituting part of the image pickup means 101. The speed at which the image pickup element 4 is driven is controlled in accordance with the shutter speed information sent from the exposure determining circuit 5. This device circuit 8 in some case is equivalent to the so-called "electronic shutter".

A signal processing circuit 9 amplifies the signal the image pickup element 4 has converted photo-electrically. The signal processing circuit 9 has an automatic gain control (AGC) amplifier.

The operation of the above-described embodiment of the invention in such form is explained by reference to the flowchart of FIG. 3.

In FIG. 3, when a signal for indicating a picture display of the electronic view finder 6 (or display start signal) is sent from a shutter button (not shown) to the exposure determining circuit 5, a step S1 is executed wherein the exposure determining circuit 5 sends a signal representing the full open aperture to the diaphragm control circuit 3 through a signal line $l_1$. Then, the diaphragm control circuit 3 sets the aperture of the diaphragm mechanism 2 to the full open position.

Then, in a step S2, a predetermined initial value concerning the shutter time is memorized in an internal register R (not shown) within the exposure determining circuit 5, and this initial value is transmitted through a signal line $l_2$ to the drive circuit 8. In this embodiment, this initial value of the shutter time is taken at 1/60 sec. The thus-initialized exposure determining circuit 5 is supplied with the photo-electrically converted image signal by the CCD 4 after subjected to predetermined treatments in passing through the signal processing circuit 9. In a step S3, the output level of this image signal is then compared with a predetermined proper signal level by the exposure determining circuit 5.

In this comparison, if the output of the above-described image signal is within a range of the predetermined proper signal level, the exposure determining circuit 5 selects the memorized shutter time in the internal register R as the drive speed for the CCD 4. After that, the CCD 4 is driven at this selected drive speed, until the picking-up of the image is commanded, or the shutter button (not shown) is pushed down.

Therefore, the object image while being controlled to a proper luminance is displayed in the EVF 6 (Steps: S3→S6→S3).

Next, if, in the step S3, the output level of the CCD 4 is lower than the predetermined proper level, or if the object brightness is low, the exposure determining circuit 5 takes it as under-exposure. Then advance to a step S4.

In the step S4, the exposure determining circuit 5 compares the presently set shutter time Tpre in the internal register R with the lowest shutter time $T_{Lo}$ in a predetermined settable shutter time range.

If the presently set shutter time Tpre is faster than the settable lowest shutter time $T_{Lo}$, a step S4-1 follows wherein the exposure determining circuit 5 alters the presently set shutter time to a slower one, and sets it. The thus-set shutter time is then memorized in the internal register R. It should be noted here that what value the shutter time is to be altered to may be calculated in the exposure determining circuit 5 so as to raise the output of the CCD 4 to the proper level. Another method may be employed that the sequence of steps: S3→S4→S4-1 is repeated to alter the shutter time stepwise in predetermined discrete values until the attainment of the output signal of the CCD 4 to the proper level is detected in the step S3.

Incidentally, in this embodiment, the settable lowest level $T_{Lo}$ of shutter time is made equal to the drive speed of the EVF 6, being 1/60 sec. Therefore, so long as the shutter speed can catch up with the luminance of the object image, the EVF 6 displays the object image at the constant luminance.

Next, if in the step S4 the presently set shutter speed is determined to be at the lowest level $T_{Lo}$, then, because the shutter speed cannot be lowered more than this, having judged that the exposure adjustment by altering the shutter speed hits the limit, the exposure determining circuit 5 turns to adjust the amplification degree (gain) for the image signal of the signal processing circuit 9. For this purpose, the exposure determining circuit 5 examines whether or not the presently set gain Gpre of the automatic gain control circuit (AGC) is smaller than the settable maximum gain Gmax (step S5).

If the presently set gain Gpre by the exposure determining circuit 5 is smaller than the settable maximum gain Gmax, then the exposure determining circuit 5 sets the gain of the signal processing circuit 9 to a larger value than at present (step S5-1), whereby the exposure that the shutter speed cannot compensate for is compensated for by increasing the gain of the circuit.

Also, if the presently set gain Gpre is at the settable maximum gain Gmax, then because the exposure cannot be increased more than this, having judged that it has exceeded the limit of exposure adjustment itself by the exposure determining circuit 5, the exposure determining circuit 5 displays what indicates low brightness warning in a display lamp (not shown) and in the EVF 6. The presently set exposure value, i.e. the shutter time, and the gain value of the AGC circuit are retained (step S6).

Next, if in the step S3 the output signal of the CCD 4 is larger than the predetermined proper level in the exposure determining circuit 5, in other words, if the object brightness is high, then advance is to a step S11 in which the presently set shutter time Tpre in the internal register R within the exposure determining circuit 5 is compared with the highest shutter time $T_{HI}$ in a predetermined settable shutter time range. If the shutter time Tpre of the present time is slower than the highest shutter time $T_{HI}$, then the exposure determining circuit 5 executes a step S11-1 to alter the shutter time to a higher value at which it is set, and memorizes it in the internal register R. This operation is carried out by repeating the steps: S3→S11→S11-1→S3. It should be noted that even in this case, what value the shutter time is to be altered to may be calculated in the exposure determining circuit 5 so that the output of the CCD 4 lowers to the proper level.

And, only when in the step S11 the shutter time has reached the changeable set maximum time $T_{HI}$, or Tpre has become a higher shutter speed than $T_{HI}$, the flow advances to a step S12 where if the present aperture value Apre is smaller than the maximum value Amax determined from the degree of deterioration of the image quality due to the diffraction phenomena, then because the aperture value can yet be closed down, transition to a step S12-1 takes place, where the aperture value is altered in a direction to further close down. Then return to the step S3, and a similar operation is repeated. It should be noted that instead of altering the aperture value, the gain adjustment of the AGC circuit may be carried out as a matter of course.

Also, when in the step S12 the present aperture value Apre has reached the maximum value Amax determined from the degree of deterioration of the image quality due to the diffraction phenomena, the exposure determining circuit 5 performs high brightness warning and retains the presently set exposure value (step S13).

By such a program, despite the variation of the brightness, the object image can be displayed at the constant luminance.

And, when the operator, for taking a shot, pushes down the shutter button (not shown) in a step S6, a record signal generated by the above-described pushing down of the shutter button is sent to the exposure determining circuit 5. Then, advance is to a step S7 where depending on the brightness of the object, or the signal output of the CCD 4, the exposure determining circuit 5 determines what values in exposure factors such as the aperture, shutter time and AGC are preset, and an exposure value Ev. It should be noted that characteristic relationship in which the preset values of the shutter time, aperture and AGC lie is called the "AE" curve, which can be defined by a calculation formula, and is previously memorized in the above-described read only memory ROM provided in the exposure determining circuit 5.

As, in such a manner, the values of the exposure factors and the exposure value have been determined by the exposure determining circuit 5, the exposure determining circuit 5 then indicates the determined exposure factors to the diaphragm control circuit 3, the drive circuit 8 and the signal processing circuit 9 (steps S7-S8).

After the exposure factors have been set in such a manner, the photo-electrically converted image signal by the CCD 4 is sent through the signal processing circuit 9 to the image recording circuit 7 where it is recorded on the recording medium (Step S9).

It should be noted that when making an exposure, the longer limit value of the shutter speed range is not equal to the above-described lowest shutter time in the settable range, but is set by taking into account the factors such as the hand-shake, the object vibrations, or the unevenness of dark current occurring in the CCD 4 when the exposure takes a long time, and the deterioration of the image quality due to the gain-up in the AGC amplifier. And, after the exposure has terminated, the flow advances to a step S10 in which the exposure factors such as the aperture, the shutter time, and the gain of the AGC amplifier return again to the values for the EVF display. Then, the procedure beginning with the step S1 being executed repeatedly.

As has been described above, since, in this embodiment, the amount of exposure of the CCD in the display state of the EFV is adjusted by the drive speed of the CCD, that is, the shutter speed, the diaphragm can be left at full open aperture. It is, therefore, when the exposure is made that the diaphragm is stopped down. As a result, the depth of field becomes large so that the picked-up image increases its sharpness from that of the image displayed in the electronic view finder before the making of the exposure. Further, in this embodiment, when the adjustable range of exposure amount by alternation of the shutter speed is exceeded, the aperture size and the gain of the AGC are also brought into adjustment. Therefore, the adjustable exposure range increases. Also, since this embodiment is able to adjust the exposure amount in accordance with the shutter speed, there is no need to provide the diaphragm mechanism. Thus, in the camera whose compactness is regarded as important, it is advantageous in respect of further minimization of the size.

In such a way, according to this embodiment, before taking a shot, the amount of exposure is adjusted by changing the drive speed of the image pickup element in response to the brightness of the object, and the exposure conditions can be set so as to fix the diaphragm to the full open state. Hence, the depth of field in the optical system becomes larger when taking the shot than before it. As a result, the recorded image becomes sharper particularly at the background than the image that was observed through the EVF before the shot.

Further, despite any change of the brightness level of the object, the object image is displayed in the electronic view finder always at a constant luminance. For the operator, the object can be recognized with a higher certainty.

Figure 4:
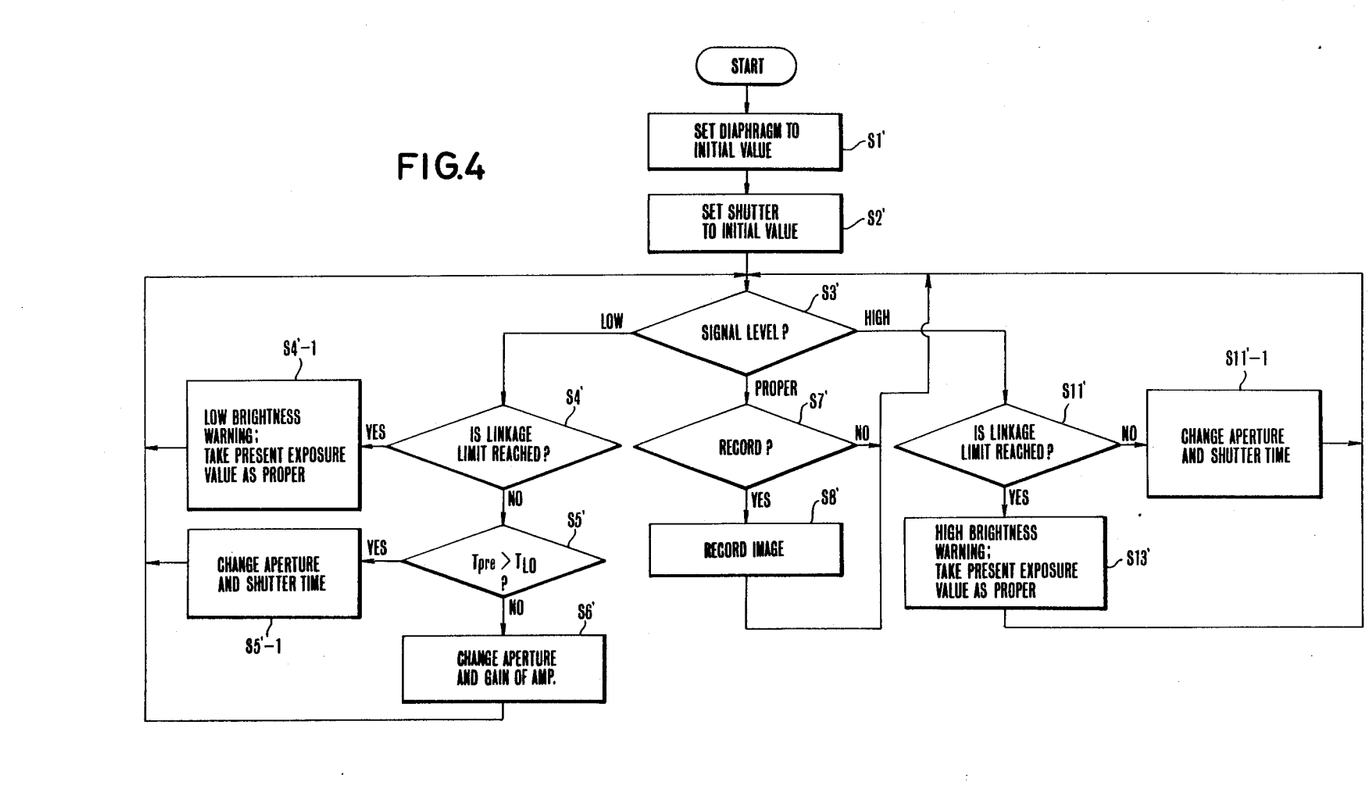
FIG. 4 is a flowchart illustrating an example of a program for the control of the exposure determining circuit 5' in a second embodiment of the invention.

Next, another embodiment of the image sensing apparatus according to the invention is described by using the flowchart shown in FIG. 4.

This embodiment is suited particularly to accomplish the before-described second object of the invention, and is to control the operation of the electronic view finder EVF so that the field of depth for the displayed image before recording and that for the picked up image when recording become the same, thus removing the disadvantage based on the difference between the depths of field of both images and the time lag due to the change of the aperture size when recording.

The fundamental circuit structure of this embodiment is the same as that in the first embodiment shown in the block diagram of FIG. 1 and FIG. 2, and the different point is in the control algorithm for an exposure determining circuit 5' shown in the flowchart of FIG. 4. And, according to this control algorithm, in any of the cases when the output of the image pickup means 101 is displayed and when recorded, the aperture size of the diaphragm 100 and/or the image pickup time of the image pickup means 101 are or is controlled in accordance with the brightness value measured by the light measuring means 104.

In FIG. 4, to set the display mode, by operating the shutter release button (not shown), a signal that indicates the electronic view finder is to display an image, (or display start signal,) is sent to the exposure determining circuit 5'. In a step S1', the exposure determining circuit 5' then sends to the diaphragm control circuit 3 an aperture setting signal representing the predetermined initial position of the diaphragm through a signal line $l_1$. Thus, the aperture of the diaphragm mechanism 2 is set to the initial position by the diaphragm control circuit 3.

Then, in a step S2', a predetermined initial value concerning the shutter time is memorized in an internal register R (not shown) within the exposure determining circuit 5', and sent to the drive circuit 8 through the signal line l₂. Even in this embodiment, this initial value is made 1/60 sec. With this, the CCD 4 photo-electrically converts the image formed thereon to a signal. This signal is sent through the signal processing circuit 9 to the exposure determining circuit 5'. In a step S3', the output level of the image signal is then compared with a predetermined proper signal level by the exposure determining circuit 5'.

In this comparison, if the output level of the above-described image signal lies within a range of the proper signal level, the shutter time memorized in the internal register R' is selected as the drive speed by the exposure determining circuit 5'. Thus, until the indication of picking up the image occurs, in other words, the shutter release button (not shown) is pushed down, the CCD 4 is driven at that selected value of drive speed. Therefore, the object image is displayed in the EVF 6, while its luminance is properly controlled (Steps: S3'→S7'→S3'). Next, if in the step S3' the output level of the CCD 4 is below the predetermined proper level, or the brightness of the object is low, the exposure determining circuit 5' takes it as under-exposure, advancing to a step S4'. In the step S4', whether or not the linkage limit value predetermined by the presently set values of the shutter time is at hand, the aperture size and other exposure factors, in other words, whether the controllable range by the shutter time, aperture value and other exposure factors, are exceeded is tested by the exposure determining circuit 5'.

When the above-described exposure factors are above the above-described linkage limit, as it implies tha the brightness of the present object is so low that setting of an exposure is impossible, the exposure determining circuit 5' produces a warning signal of the low brightness, the warning display being presented by a lamp (not shown) and in the EVF 6 (Step S4'-1). If the exposure factors do not reach the linkage limit, or lie within the settable range, the above-described exposure factors with a priority order of, for example, the shutter time, the aperture size and the gain of the AGC circuit, are set in accordance with the output level of the image signal, or the object brightness, obtained from a signal line l₃. In this embodiment, whether or not the first set shutter time Tpre in a step S5' reaches the lower limit value $T_{Lo}$ is tested by the exposure control circuit 5'. If the shutter time Tpre does not reach the limit value $T_{Lo}$, then the aperture value and the shutter time are determined in response to the brightness of the object (Step S5'-1).

And, if the present shutter time Tpre becomes the lower limit value $T_{Lo}$, then because the shutter time can no longer be varied, while the shutter time is made effective as it is, the exposure value is adjusted by the aperture value and the gain of the AGC circuit (Step S6').

If in the step S3' the output signal level of the signal processing circuit 9 is higher than the proper value, or the brightness is high as determined by the exposure determining circuit 5', then advance is to a step S11'.

In the step S11, by the exposure determining circuit 5', whether or not the exposure factors reaches the linkage limit for the object of high brightness is tested.

If the exposure factors lie within the linkage limit or are still settable, then the aperture and the shutter time are set in response to the brightness of the object by the exposure determining circuit 5' (Step S11'-1).

Further, if the exposure factors have been determined in the step S11' to reach the linkage limit, then the exposure determining circuit 5' produces a warning signal of high brightness (Step S13').

As such a procedure repeats itself, the image picked up under the same conditions when to record is displayed in EVF 6.

Therefore, when the shutter release button (not shown) is pushed down to produce a record signal for indicating a recording operation, the exposure determining circuit 5' detects this record signal in a step S7', and commands the recording circuit 7 to perform recording under the presently set exposure conditions (step S8'). Thus, the recording is carried out to a recording medium (not shown).

As has been described above, according to the invention, the exposure conditions for the display mode and record mode of the object can be made to be the same so that no deviation of the depth of field of the lens and no shutter time lag take place, whereby defocusing of the picked-up image result is prevented. Thus, an advantage that shots can be taken with higher accuracy and reliability is obtained.

Figure 5:
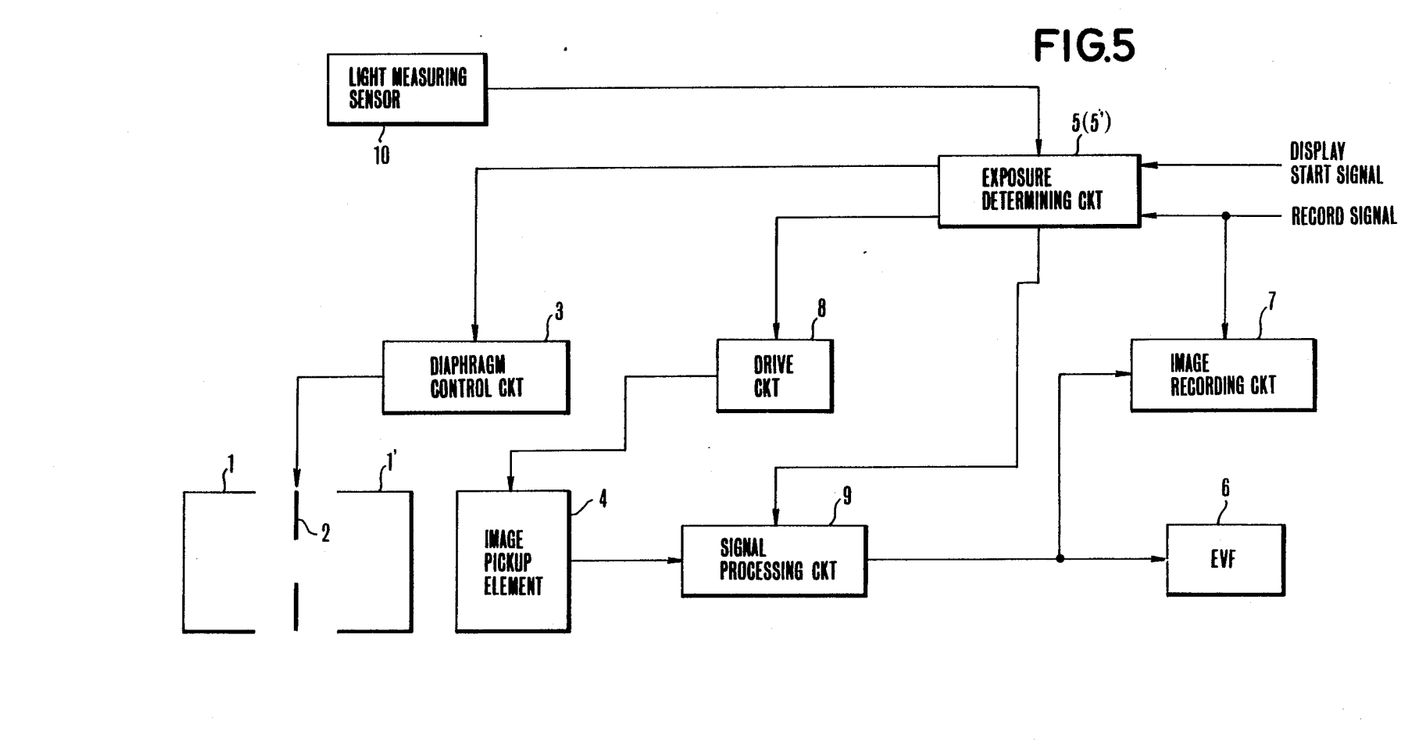
FIG. 5 is a block diagram illustrating the structure of a third embodiment of the invention.

FIG. 5 shows a third embodiment of the invention. In FIG. 5, a light measuring sensor 10 measures the brightness of an object to be photographed. While, in the first and second embodiments, the object brightness has been measured by using the signal output level of the CCD 4, it is in this embodiment that the shutter time and the aperture size are adjusted in accordance with the detection output of the light measuring sensor 10, giving an advantage that the accuracy of exposure control can be heightened, because it is free from the output of the CCD 4 differing at random.

As to the control algorithm for the exposure determining circuit 5(5'), it goes without saying that any of those described in connection with the first embodiment shown in FIG. 3 and the second embodiment shown in FIG. 4 may apply.

What is claimed is:

1. An image sensing apparatus comprising:
   (A) image pickup means for photo-electrically converting incident light;
   (B) a diaphragm for controlling the amount of light incident on said image pickup means;
   (C) display means for displaying an output of said image pickup means;
   (D) recording means for recording the output of said image pickup means;
   (E) light measuring means for measuring an ambient brightness; and
   (F) control means, operable at times when said display means displays the output of said image pickup means and said recording means is inoperative, for setting said diaphragm to a predetermined aperture size, and for controlling an image pickup period of said image pickup means in accordance with the brightness measured by said light measuring means.

2. An apparatus according to claim 1, wherein the predetermined aperture size of said diaphragm is a full open aperture state.

3. An apparatus according to claim 1, wherein said control means compares a level of an image signal produced from said image pickup means under the condition that said diaphragm is set in the predetermined aperture size with a predetermined proper signal level, and, when the level of the image signal becomes equal to said proper signal level within a predetermined range, makes a recording operation possible.

4. An apparatus according to claim 3, wherein said control means compares the level of said image signal with said proper signal level under the condition that said diaphragm is set in said predetermined aperture size, and, when both said levels are not equal to each other, controls a shutter speed so that the level of said image signal becomes equal to said proper signal level within said predetermined range.

5. An apparatus according to claim 4, wherein said control means has a first control algorithm for controlling the gain of an automatic gain control circuit when the difference between the level of said image signal and said proper signal level does not fall within said predetermined range even if said shutter speed is varied to a limit of its changeability under the condition that said diaphragm is set in the predetermined aperture size.

6. An apparatus according to claim 5, wherein said control means further includes a second control algorithm for controlling said diaphragm when the difference between the level of said image signal and said proper signal level does not fall within said predetermined range even if said shutter speed is varied to a limit of its changeability under the condition that said diaphragm is set in the predetermined aperture size.

7. An apparatus according to claim 6, wherein said control means controls an exposure based on said first control algorithm when the level of the image signal produced from said image pickup means is lower than said proper signal level.

8. An apparatus according to claim 6, wherein said control means controls an exposure based on said second control algorithm when the level of said image signal is higher than said proper signal level.

9. An apparatus according to claim 7 or 8, wherein said control means, when the control of the exposure results in the impossibility of control that the output signal level of said image signal becomes equal to said proper signal level within the predetermined range, produces a warning signal and makes exposure information of that time to be a proper value.

10. An apparatus according to claim 3, 7 or 8, wherein when a command for a recording operation is given, said control means sets predetermined values of exposure factors including an aperture size, a shutter time and a gain of AGC and an exposure value, based on which said image pickup means is controlled, and an output image signal of said image pickup means is recorded by said recording means.

11. An apparatus according to claim 1, wherein said display means is an electronic view finder.

12. An apparatus according to claim 1, wherein said image pickup means is a CCD (Charge Coupled Device).

13. An apparatus according to claim 1, wherein said recording means is a means for magnetically recording an output image signal of said image pickup means on a magnetic sheet including a floppy disk.

14. An image sensing apparatus comprising:
(A) image pickup means for photo-electrically converting incident light;
(B) a diaphragm for controlling the amount of light incident on said image pickup means;
(C) display means for displaying an output of said image pickup means;
(D) recording means for recording the output of said image pickup means;
(E) light measuring means for measuring an ambient brightness; and
(F) control means, before recording operation of said recording means when said display means is displaying the output of said image pickup means, for controlling an aperture size of said diaphragm and/or storage time of said image pickup means in accordance with the brightness measured by said light measuring means and for holding an output of said image pickup means within a predetermined range.

15. An apparatus according to claim 14, wherein said display means is an electronic view finder.

16. An apparatus according to claim 14, wherein said control means compares a level of an image signal produced from said image pickup means under the condition that said aperture size and a shutter speed are set in initial values with a predetermined proper level, and, when the level of the image signal becomes equal to said proper signal level within a predetermined allowable range, makes possible a recording operation based on exposure information of that time.

17. An apparatus according to claim 16, wherein said control means compares the level of said image signal with said proper signal level, and, when both said levels are not equal to each other, discriminates whether or not the presently set exposure state of the diaphragm exceeds a limit value of a predetermined controllable range of the diaphragm, and, when said limit value is not exceeded, changes said shutter speed and the aperture size within a range of not exceeding said limit value so that said image signal level becomes equal to said proper signal level.

18. An apparatus according to claim 17, wherein said control means, when an exposure cannot be controlled within said controllable range, produces a waning signal and makes exposure information of that time to be a proper value.

19. An apparatus according to claim 17, wherein said control means, when said image signal level is lower than said proper signal level but the exposure state of that time lies within said predetermined exposure-controllable range, changes the aperture size and the shutter speed to control the exposure, or when the change of the aperture size and the shutter speed reaches a limit, controls a gain of a signal system.

20. An apparatus according to claim 14, wherein said image pickup means is a CCD (Charge Coupled Device).

21. An apparatus according to claim 16, wherein said recording means is a means for magnetically recording the output image signal of said image pickup means on a magnetic sheet including a floppy disk.

22. An image sensing apparatus comprising:
(A) image pickup means for electrically converting incident light to produce an image signal;
(B) an electronic view finder for displaying the image signal produced from said image pickup means;
(C) recording means for recording the image signal produced from said image pickup means;
(D) exposure variable means for varying the amount of light incident on said image pickup means; and
(E) control means for controlling said exposure variable means on the basis of the image signal produced from said image pickup means such that the depth of field of image information to be recorded by said recording means is equal to or deeper than that of the image information displayed in said electronic view finder before the recording is carried out by said recording means, said control means controlling said exposure variable means to hold said image signal at a predetermined level before the operation of said recording means.

23. An apparatus according to claim 22, wherein said exposure variable means varies exposure factors including an aperture size and a shutter speed, so that a level of the image signal produced from said image pickup means is controlled to be equal to a predetermined proper level within a predetermined range.

24. An apparatus according to claim 23, wherein said control means sets said aperture size initially to a full open aperture state when said recording means is inoperative.

25. An apparatus according to claim 24, wherein said control means, when said recording means is recording the image signal, controls said exposure variable means again to set an exposure.

26. An apparatus according to claim 23, wherein said control means, when said recording means is inoperative, varies said aperture size and shutter speed so that said image signal level is controlled to be equal to said proper level, and when in recording, allows the recording to be performed in the same state as before the recording.

27. An apparatus according to claim 23, wherein said control means controls a gain of a signal system when said image signal level does not become equal to said proper signal level within a dynamic range of said exposure variable means.

28. An apparatus according to claim 27, wherein the control of said gain takes place when said image signal level is lower than said proper signal level.

29. An apparatus according to claim 22, wherein said image pickup means is a CCD.

30. An electronic camera comprising:

(A) an image pickup element for photo-electrically converting incident light to produce an image signal;
(B) exposure control means for controlling the amount of light incident on said image pickup element in accordance with the level of said image signal;
(C) monitoring means for displaying the image signal produced from said image pickup element;
(D) recording means for recording said image signal; and
(E) control means for controlling said exposure control means so that the depth of field when said recording means operates does not become deeper than that of the image displayed on said monitoring means when said recording means is inoperative, said control means being arranged to control said exposure control means to hold said image signal at a predetermined level when said recording means is in inoperative state.

31. An electronic camera according to claim 30, wherein said control means has a mode in which the exposure setting information and the depth of field are controlled to be the same between when said recording means operates and when said recording means is inoperative but the display is only presented on said monitoring means.

32. An electronic camera according to claim 30, wherein said exposure control means includes a diaphragm, and said control means has a mode that when the displaying is only performed on said monitoring means leaving said recording means inoperative, said diaphragm is set to a full open aperture state, and when said recording means operates, said exposure control means is set again.

33. An electronic camera according to claim 31 or 32, wherein said control means includes means for controlling a drive speed of said image pickup means.

34. An electronic camera according to claim 33, wherein said monitoring means is an electronic view finder.

* * * * *